United States Patent [19]
Yukino

[11] Patent Number: 4,799,563
[45] Date of Patent: Jan. 24, 1989

[54] DEVICE FOR MOUNTING AN IMPLEMENT ON A TRACTOR

[75] Inventor: Hiroyasu Yukino, Chaya, Japan

[73] Assignee: Yanmar Diesel Engine Co., Ltd., Osaka, Japan

[21] Appl. No.: 117,581

[22] Filed: Nov. 6, 1987

[51] Int. Cl.⁴ .............................................. B60K 25/00
[52] U.S. Cl. .................................. 180/14.4; 180/53.3; 280/415.1
[58] Field of Search .................... 180/53.3, 14.4, 75.2; 280/415 R

[56] References Cited

U.S. PATENT DOCUMENTS

| | | | |
|---|---|---|---|
| 2,703,954 | 3/1955 | Preble | 180/53.3 |
| 4,176,727 | 12/1979 | Perin | 180/53.3 |

Primary Examiner—John A. Pekar
Attorney, Agent, or Firm—Armstrong, Nikaido, Marmelstein & Kubovcik

[57] ABSTRACT

In a device for mounting an implement on a tractor wherein a body of the tractor is provided with an upwardly and downwardly movable hitch to which the implement is adapted to releasably mounted, a drive shaft associated to the hitch and drivingly connected to a PTO shaft of the tractor is supported by the hitch and is operable to transmit a power to an input shaft of the implement through shaft coupling means. The hitch is provided with an upper engagement hook opened upwardly and a lower engagement hook opened toward the implement to be engaged with the implement. The shaft coupling means includes a self-aligning mechanism.

5 Claims, 5 Drawing Sheets

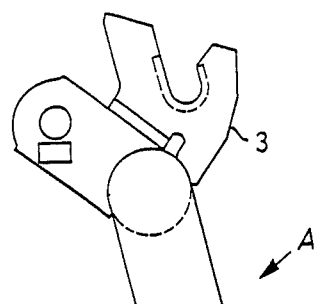
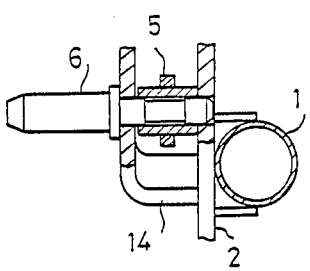
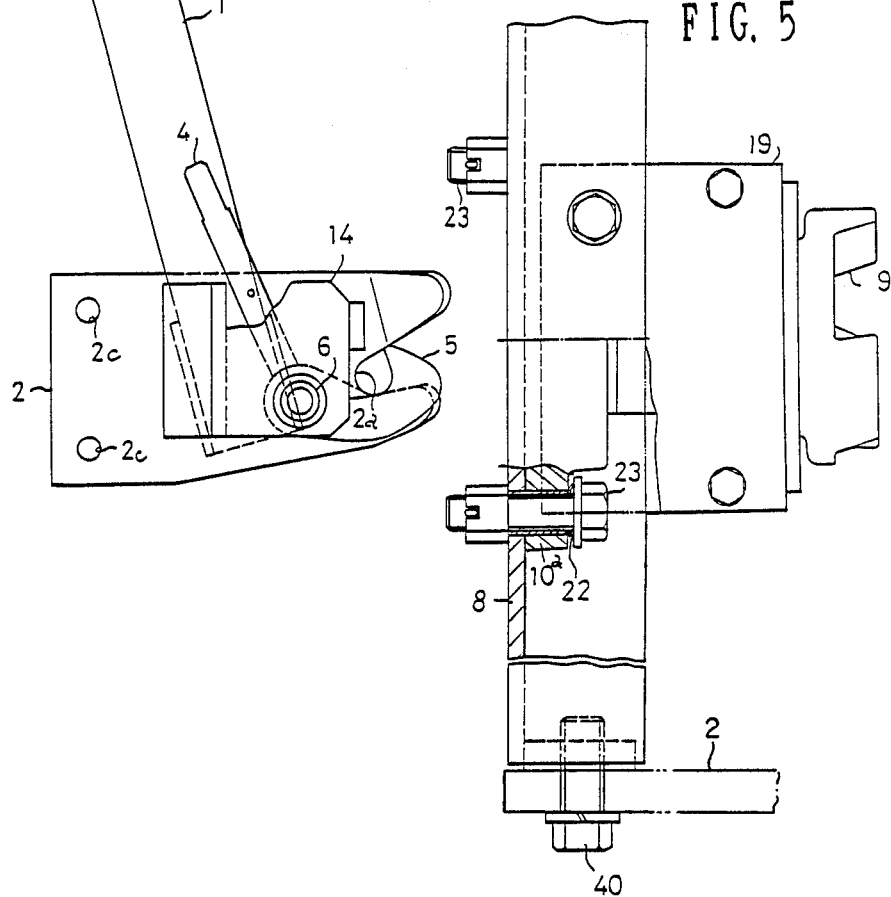

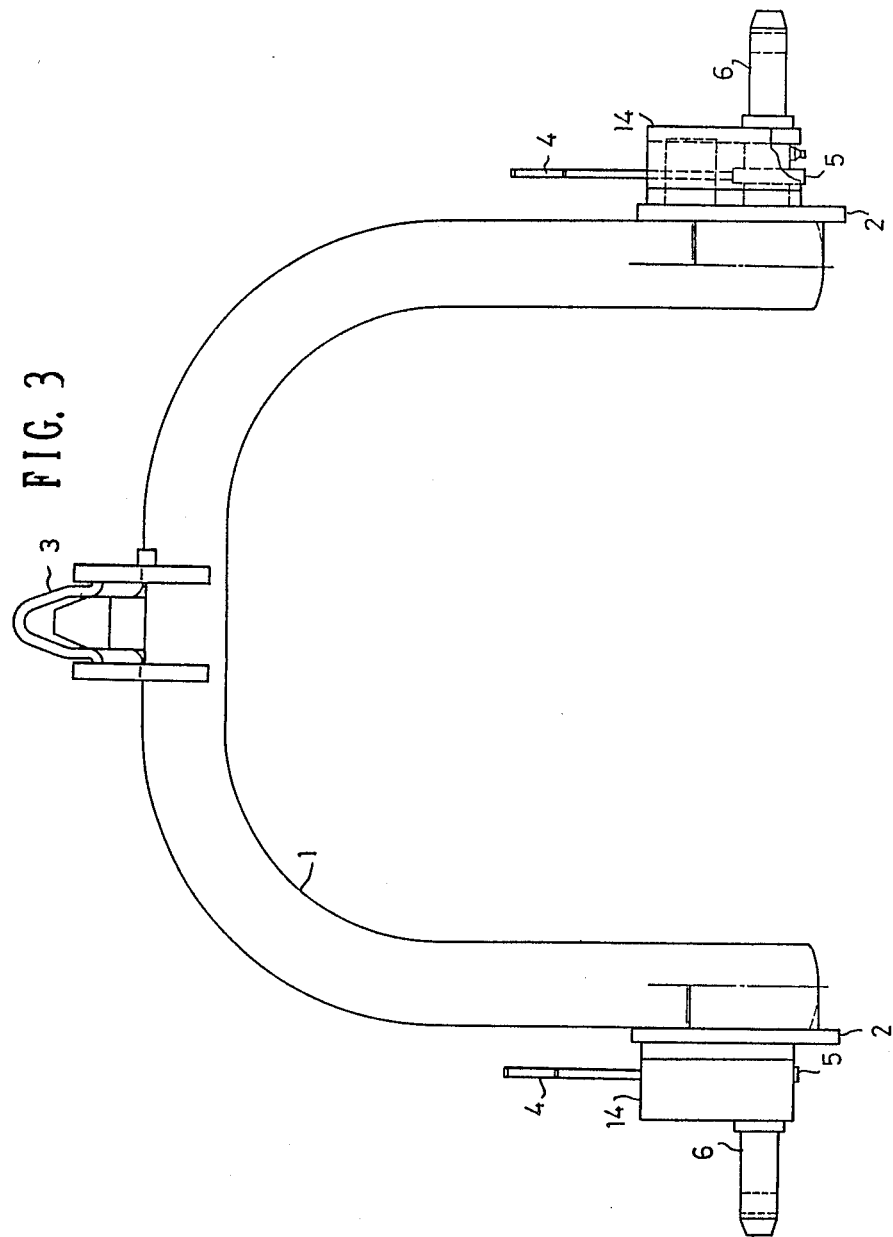

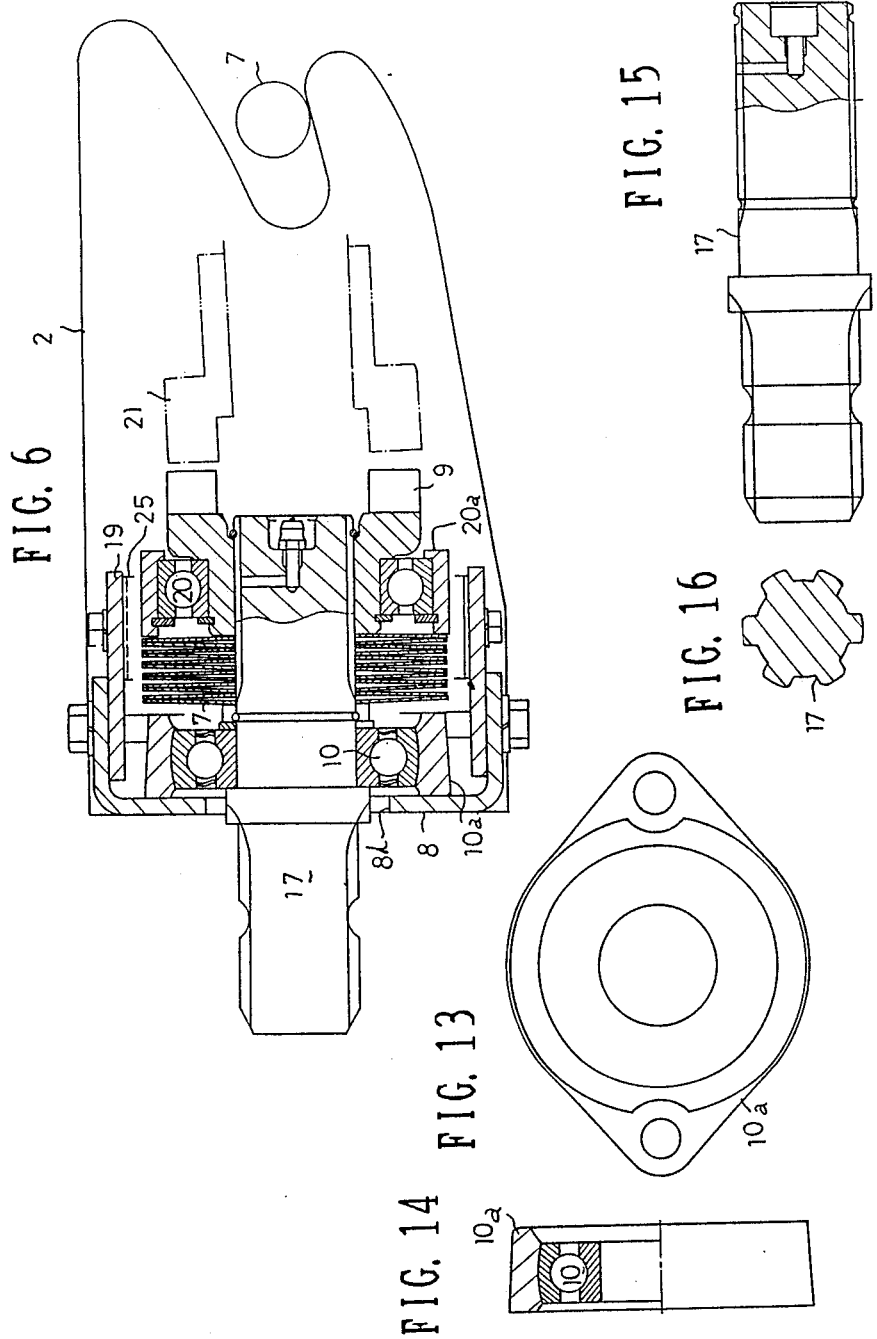

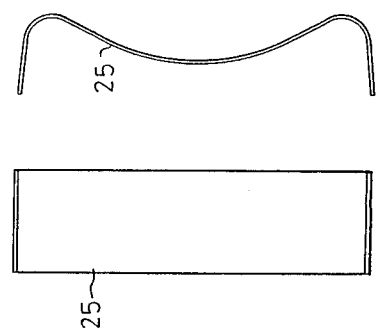
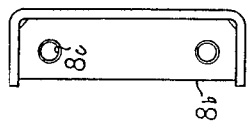
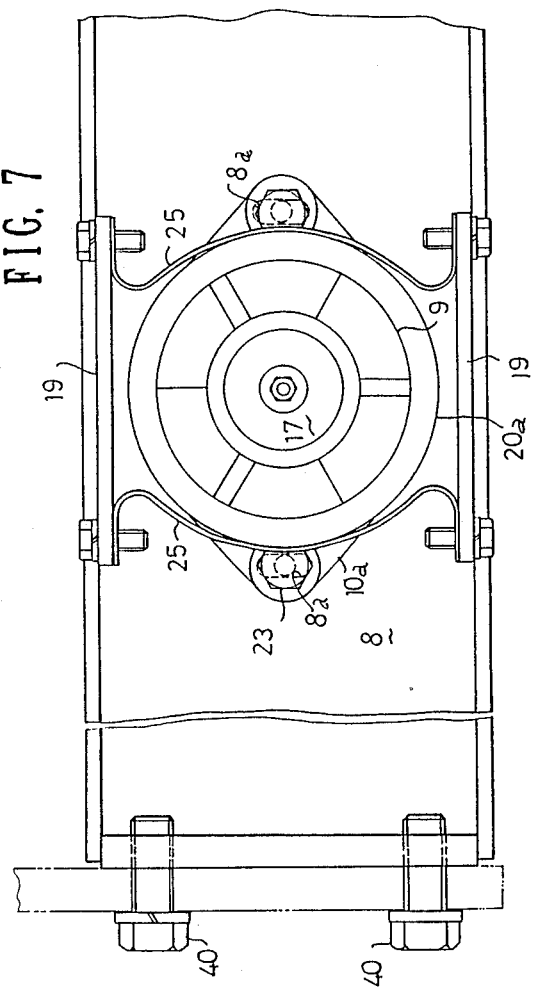
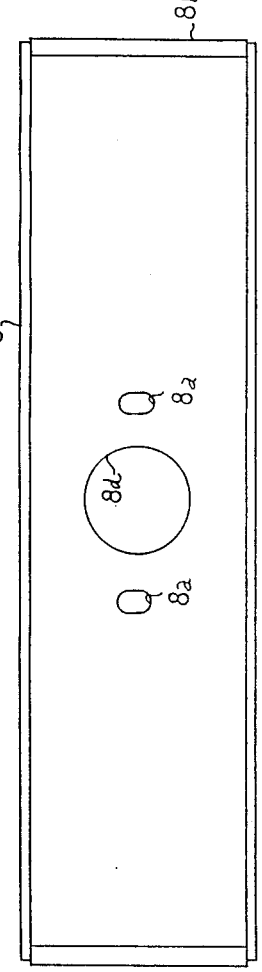

DEVICE FOR MOUNTING AN IMPLEMENT ON A TRACTOR

BACKGROUND OF THE INVENTION

The present invention relates to a device for mounting or connecting an implement or a working unit, such as a rotary plow, to an agriculture tractor, and particularly to a device, in which an operator can connect or mount the implement by vertically moving a hitch (i.e., implement mounting hitch) by means of a hydraulic lifter without leaving an operator's seat.

An example of an art for facilitating the mounting operation of an implement of a tractor is described in U.S. Pat. No. 3,643,976.

This prior art is, however, directed to an art, in which connection of an implement can be accomplished by backward movement of the tractor even when the implement is not accurately aligned to the tractor. According to this prior art, it is impossible to accomplish the mounting of the completely separated implement to the tractor.

Further, in the above prior art, it is impossible to automatically connect completely separated shaft of the implement to a shaft of the tractor.

Accordingly, it is an object of the invention to provide an improved device, overcoming the above-noted disadvantages.

It is also an object of the invention to provide an improved device, in which an implement can be mounted to the tractor by approaching a hitch to the implement, which is compltely separated from the tractor, scooping up an upper engagement hook of the implement to engage the hitch thereto, and then, gradually drawing it toward the tractor.

Further, it is an object of the invention to provide an improved device, in which a shaft of the implement is automatically connected to a drive shaft connected to a PTO (power take-off) shaft simultaneously with the mounting of the implement.

It is also an object of the invention to provide an improved device, in which bearings for the drive shaft can correct inclination and/or radial deviation of members of the coupling means, which may prevent proper meshing of the connecting members in the conventional structure, to ensure the coupling of the shafts.

Further, it is an object of the invention to provide a self-aligning mechanism in the device so as to prevent noise in the coupling mechanism, partial wear of the bearings and undesirable disengagement of the coupling members.

SUMMARY OF THE INVENTION

In order to accomplish the above objects, the apparatus according to the invention wherein a body of a tractor is provided with an upwardly and downwardly movable hitch to which an implement is adapted to be releasbly mounted, is characterized in that a drive shaft associated to the hitch and drivingly connected to a PTO shaft of the tractor is supported by said hitch and is operable to transmit a power to an input shaft of the implement through shaft coupling means.

The device may be provided with an upper engagement hook opened upwardly and a lower engagement hook opened toward the implement to be engaged with the implement.

The shaft coupling means may include a self-aligning mechanism.

A pair of lower link pins provided in the implement, which is held by the hitch, may be positioned substantially on a same line as the driving shaft in the hitch.

The shaft coupling means may include meshing portions which are positioned substantially vertically below the engagement portion of an upper engagement hook provided in the hitch and an upper pin provided at a top link mast of the implement.

Other and further objects, features and advantages of the invention will appear more fully from the following description of the preferred embodiments of the invention.

BRIEF DESCRIPTION OF THE DRAWINGS

FIG. 2 is a side view of a frame and a lower engagement hook provided in the hitch;

FIG. 3 is a rear view of the structure illustrated in FIG. 2;

FIG. 4 is a horizontally sectional view of a part of the lower engagement hook;

FIG. 5 is a plan view of a hitch plate with a certain part cut away;

FIG. 6 is a side view of a section of a structure for supporting a drive shaft by the hitch plate;

FIG. 7 is a rear view of the structure illustrated in FIG. 6;

FIG. 8 is a rear view of the hitch plate;

FIG. 9 is a side view of the hitch plate;

FIG. 10 is a side view of an elastic holder plate;

FIG. 11 is a rear view of the elastic holder plate;

FIG. 12 is a plan view of a part of the elastic holder plate including a hole for a bolt;

FIG. 13 is a rear view of a bearing and a bearing case for the drive shaft;

FIG. 14 is a side view of a section of the structure illustrated in FIG. 13;

FIG. 15 is a side view of the drive shaft with a certain part cut away; and

FIG. 16 is a sectional view of the drive shaft;

DETAILED DESCRIPTION OF THE PREFERRED EMBODIMENTS

Figure 1:
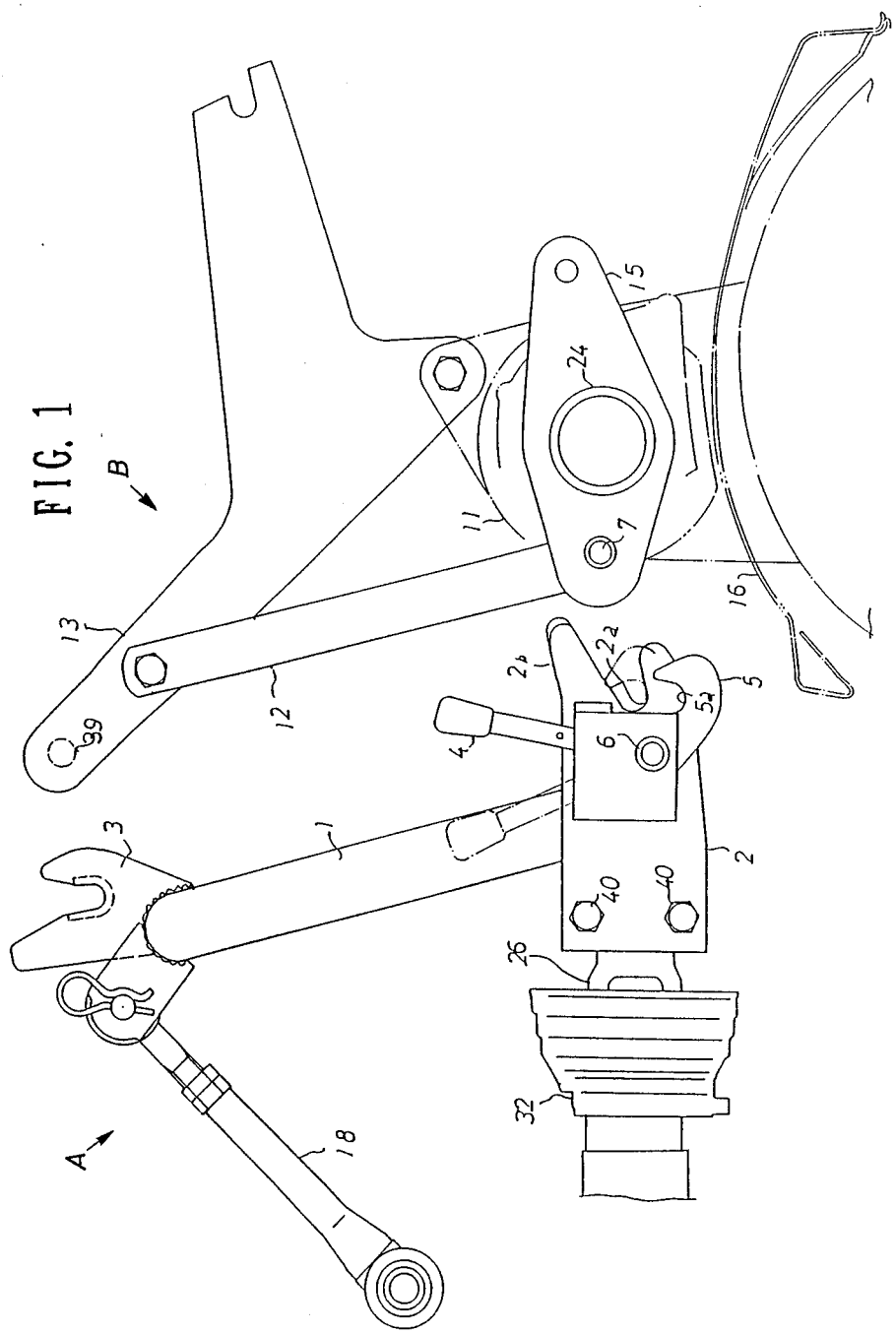
FIG. 1 is a side view of an implement mounting device according to the invention.

Referring to FIG. 1, a mounting device of 3-point link type for an implement is arranged at a rear of an agriculture tractor. The device includes a top link 18 and lower links (not shown).

An implement mounting hitch A according to the invention is mounted at the rear end of the mounting device of the 3-point link type.

The implement mounting hitch A comprises a frame 1, a pair of lower engagement hooks 2, an upper engagement hook 3, a pair of hooks 5 associated to the hooks 2, a hitch plate 8 (FIG. 5) and lower link pins 6.

The top link 18 of the mounting device is pivotably connected at the rear end thereof to the upper end of the frame 1 through a pin. The lower links are fitted at the rear ends thereof to the lower link pins 6 of the hitch A.

The one top link 18 and a pair of said lower links support three points of the hitch A and is adapted to raise and lower it by a hydraulic unit provided in the tractor.

The vertical movement of the mounting hitch A can cause engagement of an upper pin 39, which is provided at a top link mast 13 (connected to the top link mast 12) in an implement B, with the engagement hook 3 at the upper end of the frame 1.

When the mounting hitch A is raised after this engagement, the implement B is drawn toward the mounting hitch A, so that lower link pins 7 of the implement are fitted into concave portions 2a of the hooks 2 after pushing away from hooks 5. Then, the hooks 5 which are biased by springs return to an initial position, in which the pins 7 are fitted into concave portions 5a provided at the hooks 5, so that the implement B is completely mounted to the mounting hitch A.

In order to accomplish the above engagement, the upper engagement hook 3 is projected upwardly from the frame 1.

Each lower hook 2 of the mounting hitch A opens toward the lower link pin 7 provided at a lower link hinge 15 in the implement B.

At 4 is indicated a release handle or lever for releasing the engagement of the hook 5.

In order to release the implement B from the mounting hitch A, the release handle 4 is operated to a release position to open the hook 5. Then, the mounting hitch A is lowered to release the engagement of the lower engagement hooks 2 and the lower link pins 7, and then, the upper engagement hook 3 is released from the upper pin 39. Thereafter, the tractor is moved forwardly.

The position of the lower link pins 7 in the implement B are so determined that they may be aligned on a same line as a drive shaft 17 (FIGS. 6 and 7) supported in the hitch A when the pins 7 are fitted into the engagement concave portions 2a at the lower engagement hook 2 to mount the implement B.

In FIG. 1, at 11 is indicated a gearbox for the implement (e.g., a rotary plow). At 16 is indicated a cover of the rotary plow. At 24 is indicated a main beam.

As shown in FIG. 3, the frame 1 is of inverted U-shape, and the upper engagement hook 3 is rigidly fixed to an upper central portion of the frame 1. The hooks 5 are supported by lower link pins 6, which is rigidly fixed to the opposite lower ends of the frame 1.

As shown in FIG. 4, each lower link pin 6 is fixed to the lower engagement hook 2 and a bent reinforcement plate 14.

Each hook 5 is rigidly connected to the release lever 4 (FIG. 1) and is supported by an outer periphery of a cylindrical support shaft, of which inner periphery is supported by the lower link pin 6.

A spring (not shown) is connected to each release lever 4 so that the lever 4 may be held by the elastic force thereof either in a release position or an engagement position for holding the lower link pin 7.

The hitch plate 8 is illustrated also in FIG. 5. The drive shaft 17 is supported by the hitch plate 8 in a manner as illustrated in FIGS. 6 and 7. The rear and side view of the hitch plate 8 are illustrated in FIG. 8 and 9, respectively. An elastical holder plate 25 is illustrated in FIG. 10 and 11. The holder plate 25 includes a hole for a bolt as illustrated in FIG. 12. Bearings for the drive shaft and bearing cases are constructed as illustrated in FIGS. 6, 7, 13 and 14. The drive shaft 17 is constructed as illustrated in FIGS. 15 and 16.

As described before, the implement B is mounted by engaging the upper and lower engagement hooks 2 and 3 of the hitch A with the upper pin 39 and the lower link pins 7 of the implement B. Simultaneously with this engagement, the drive shaft 17 connected to a PTO shaft of the tractor is automatically coupled to an input shaft of the rotary gear box 11 (FIG. 1).

A universal joint 26 (FIG. 1) covered by a universal joint cover 32 is projected rearwardly from the PTO shaft, and is coupled to the drive shaft 17 which is supported by the plate 8 of the hitch A through the bearings.

As shown in FIG. 7, the drive shaft 17 is disposed at a central position of the hitch plate 8, and is so adapted that a coupling member 9 (FIG. 6) on the drive shaft 17 is automatically coupled with a coupling member 21 on the input shaft of the implement B. Simultaneously with said mounting of the implement B.

Bolts 40 (FIG. 7) are inserted into the holes provided at the lower engagement hooks 2 and is screwed into threaded apertures 8c formed in end plates 8b provided at the ends of the hitch plate 8, so that, as shown in FIGS. 8 and 9, the hitch plate 8 is fixed between a pair of the lower engagement hooks 2 by the bolts 40.

When viewed in the forward direction, (e.g., as FIG. 3), the coupling members 9 and 21 (FIG. 1) are coupled to a central position of the hitch plate 8, which is vertically aligned with the engaged upper hook 3 (FIG. 1) and the upper pins 39.

The hitch plate 8 is provided at the central position thereof with a hole 8d (FIG. 8) for passing the drive shaft 17 therethrough, and is also provided at lengthwise opposite sides of the hole 8d with a pair of vertically long apertures 8a for vertically movably supporting a drive shaft bearing 10 (FIG. 6).

The universal joint 26 (FIG. 1) is splined to the front end of the drive shaift 17. The drive shaft 17 is provided at the rear end thereof with the coupling 9, which engages the coupling 21 at the front end of the input shaft of the implement to transmit a power thereto.

Even when the drive shaft 17 is coupled with the input shaft of the implement, there are often radial deviation between the two shafts. In order to coaxially positioning them at initial rotation thereof, the drive shaft 17 is radially movably supported, as described below.

The drive shaft 17 is supported by the bearing 18 as well as a bearing 20, both of which are movable to some extent.

The bearing case 10a of the bearing 10 is supported by bolts 23 inserted into said long apertures 8a in the hitch plate 8. As shown in FIG. 5, a wave-shaped washer 22 is interposed between the bearing case 10a and each bolt 23.

The washer 22 is softly held between the bearing case 10a and the bolt 23 so that the bearing case 10a can move vertically along the long aperture 8a.

Further, the bearing 20 supporting the rear portion of the shaft 17 has a bearing case 20a which is biased by the elastic holder plates 25. As shown in FIG. 7, the plates 25 are disposed at horizontally opposite sides of the case 20a, so as to elastically holding the rear end of the shaft 17 at the regular central position. Each holder plate 25 is formed by a plate spring and is fixed at it upper and lower ends by the bolts to support members 19, which are fixed to the hitch plate 8, as shown in FIG. 6.

This structure permits radial movement of the bearing 20 to some extent.

Therefore, even when the coupled members 9 and 21 are radially deviated from each other, this deviation will be corrected by the radial movement of the bearing 20, which is permitted by the elastic deflection of the holder plates 25.

As shown in FIG. 6, the coupling members 9 and 21 are provided with axial concave portions and convex portions to be alternately fitted into each other. In the mounting operation, in which the implement B is drawn toward the mounting hitch A, the convex portions of both of the coupling members 9 and 21 may contact each other, in which case either of them should retreat.

In order to perform this retreat, the coupling member 9 and the bearing 20 fitted therearound are axially movable on the drive shaft 17. Further, axially stacked Belleville springs 7 are interposed around the shaft 17 and between the coupling member 9 and the bearing 10 so as to return the forwardly retreated member 9 and the bearing 20 to the initial position.

As illustrated in FIGS. 15 and 16, the forward end of the drive shaft 17 has a nearly hexagonal section and is provided with spline teeth. That is; the forward end of the shaft 17 has a section same as that of a conventional input shaft of an implement, so that the shaft 17 may be connected to the universal joint (FIG. 1) of the tractor.

The invention described above has following advantages.

First of all, the implement B can be facilely mounted and released by lifting or lowering the implement B with the operator staying on the operator's seat.

Further, the drive shaft 17 and the input shaft of the implement B can be coupled simultaneously with the mounting of the implement without manual operation for coupling the universal joint, which is required in the conventional structure, after the mounting of the implement.

Even if there is a radial deviation or relative inclination between the drive shaft 17 and the input shaft of the implement, the coupling members 9 and 21 are automatically aligned with each other and smoothly coupled together when the implement B is mounted to the hitch A.

When mounted, the implement B is reliably fixed to the hitch A by the upper and lower hooks 2 and 3, so that it can be mounted stably without generating vibration and noises, resulting in long durability.

Although the invention has been described in its preferred form with a certain degree of particularity, it is understood that the structure of the preferred form may be changed in the details of construction, and that the combination and arrangement of parts may be modified without departing from the spirit and scope of the invention as hereinafter claimed.

What is claimed is:

1. A device for mounting an implement on a tractor wherein a body of the tractor is provided with an upwardly and downwardly movable hitch having an upper hitch link and two horizonally spaced lower hitch links and an implement having attachment means for attachment to said upper hitch link and said spaced lower hitch links, characterized in that a drive shaft associated to the hitch and drivingly connected to a PTO shaft of the tractor is supported in substantial horizontal alignment with and substantially intermediate said lower hitch links by said hitch and is operable to transmit a power to an input shiaft of the implement through shaft coupling means.

2. A device of claim 1 wherein said hitch is provided with an upper engagement hook opened upwardly and lower engagement hooks opened toward the implement to be engaged with the implement.

3. A device of claim 1 wherein said shaft coupling means includes a self-aligning mechanism.

4. A device of claim 1 wherein a pair of lower link pins provided in the implement are positioned substantially on a same line as the driving shaft in the hitch, when the implement is mounted to the hitch.

5. A device of claim 1 wherein said shaft coupling means includes meshing portions which are positioned substantially vertically below the engagement portion of said upper hitch link on said tractor and an upper pin provided at a top link mast of the implement.

* * * * *